United States Patent [19]

Suzuki et al.

[11] Patent Number: 4,886,556
[45] Date of Patent: Dec. 12, 1989

[54] METHOD FOR PRODUCTION OF SLIDING MEMBER

[75] Inventors: Shigeo Suzuki, Yokohama; Kazuyuki Yasuda, Tokyo, both of Japan

[73] Assignee: Kabushiki Kaisha Toshiba, Kawasaki, Japan

[21] Appl. No.: 883,428

[22] Filed: Jul. 14, 1986

Related U.S. Application Data

[63] Continuation-in-part of Ser. No. 785,674, Oct. 9, 1985, abandoned.

[30] Foreign Application Priority Data

Oct. 10, 1984 [JP] Japan ............................ 59-212124

[51] Int. Cl.$^4$ .............................................. C04B 35/58
[52] U.S. Cl. ............................... 264/63; 264/65; 264/66; 264/67
[58] Field of Search ................. 264/67, 63, 65, 66; 423/344

[56] References Cited

U.S. PATENT DOCUMENTS

| | | | |
|---|---|---|---|
| 4,410,285 | 10/1983 | Strasser et al. | 384/278 |
| 4,410,636 | 10/1983 | Minjolle | 264/65 X |
| 4,443,394 | 4/1984 | Ezis | 264/65 |
| 4,492,665 | 1/1985 | Pompe | 264/65 |
| 4,511,525 | 4/1985 | Tsuge et al. | 264/65 |
| 4,522,453 | 6/1985 | Lammer et al. | 308/DIG. 8 X |
| 4,560,669 | 12/1985 | Matsuhiro et al. | 264/65 X |
| 4,590,053 | 5/1986 | Hashimoto et al. | 423/344 |
| 4,619,905 | 10/1986 | Natansohn et al. | 423/344 |

FOREIGN PATENT DOCUMENTS

| | | |
|---|---|---|
| 080050 | 10/1982 | European Pat. Off. . |
| 111922 | 12/1983 | European Pat. Off. . |
| 176315 | 4/1986 | European Pat. Off. . |
| 2402382 | 7/1974 | Fed. Rep. of Germany ...... 384/278 |
| 100421 | 7/1980 | Japan ............................ 384/907 |
| 59-97508 | 6/1984 | Japan ............................ 423/344 |
| 60-36312 | 2/1985 | Japan ............................ 423/344 |
| 1389410 | 4/1975 | United Kingdom ............. 384/907 |

OTHER PUBLICATIONS

F. R. Morrison et al., "The Load-Life Relationship for M50 Steel Bearings with Silicon Nitride Ceramic Balls", *Lubrication Engineering*, vol. 40, 3, 153-159.

Antriebstechnik, vol. 16, No. 3, 1977, pp. 130-135, Frankfurt, Mainz, DE; H. Kessel et al.

American Ceramic Society Bulletin, vol. 63, No. 9, Sep., 1984, pp. 1158, 1159, 1164, Columbus, Ohio, K. Komeya.

Chemical Abstracts, vol. 93, No. 10, Sep. 1980, p. 319, Abstract No. 100425f.

Chemical Abstracts, vol. 101, No. 22, Nov. 1984, p. 295, Abstract No. 196935e.

*Primary Examiner*—James Derrington
*Attorney, Agent, or Firm*—Finnegan, Henderson, Farabow, Garrett and Dunner

[57] ABSTRACT

A method for production of a sliding member exhibiting excellent mechanical strength, resistance to thermal shock, and resistance to corrosion at elevated temperature is produced by a process of manufacture which comprises firing a shaped mass of silicon nitride powder obtained by the silica reduction method and cutting the resultant sintered ceramic mass in a prescribed shape by machining.

6 Claims, 1 Drawing Sheet

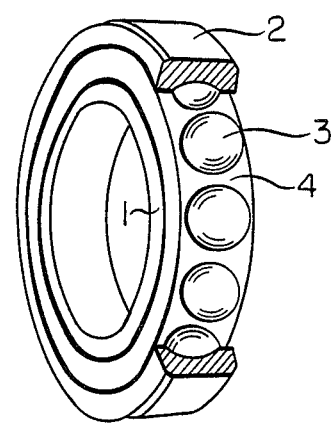

METHOD FOR PRODUCTION OF SLIDING MEMBER

The present application is continuation-in-part of U.S. patent application Ser. No. 785,674 filed Oct. 9, 1985, now abandoned.

FIELD OF THE INVENTION

This invention relates to method for production of a sliding member made of a sintered ceramic material consisting preponderantly of silicon nitride ($Si_3N_4$) and exhibiting excellence in mechanical strength, resistance to thermal shock, and resistance to corrosion at elevated temperatures. It has previously been proposed to use a sintered ceramic material exhibiting excellent mechanical properties at elevated temperatures in bearings destined to serve in atmospheres of elevated temperatures.

The conventional sintered ceramic material, however, has the disadvantage that the bearings made of such material, when used in liquids such as fused metals which are held at elevated temperatures and are highly corrosive, are deficient in mechanical strength, resistance to thermal shock, and resistance to corrosion and undergo breakage early.

BACKGROUND OF THE INVENTION

Various attempts have been made to solve these problems mentioned above. For example, F. Strasser et al disclose in their invention (U.S. Pat. No. 4,410,285) a sliding member formed of an outer metal ring and an inner bearing of a ceramic material, and a ring of a metal felt located between the metal ring and the ceramic material ring.

F. R. Marrison et al give the results from their studies (Lubrication Engineering, vol. 40.3, 153–159) wherein the fatigue property of ceramic balls of $Si_3N_4$ and steel bearings was measured in detail.

The above disclose the use of ceramics in combination with a metal.

J. Lammer et al disclose in their invention (U.S. Pat. No. 4,522,453) a sliding member formed of a member coated with TiC and a member coated with TiN.

Yamamoto et al disclose in their invention (Japanese Patent No. S55-100421) that a sliding member comprises a member of sintered $Si_3N_4$ and a member of sintered SiC, is capable of using in non-lubricated condition and less wearing. They are the combination of ceramics.

Silicon nitride type sintered ceramic materials have found popular recognition as sintered ceramic materials of large mechanical strength. Unfortunately, the silicon nitride type sintered ceramic materials produced by the metal silicon nitriding method, the imide method, etc. and offered generally in the market fail to satisfy the levels of mechanical strength, resistance to thermal shock, and resistance to corrosion which sliding members destined to serve in atmospheres of elevated temperatures.

OBJECT AND SUMMARY OF THE INVENTION

The inventors continued a diligent study directed to the elimination of the drawbacks suffered by the conventional sintered ceramic materials as described above. They have, consequently, found that sliding members produced by using silicon nitride powder obtained by the silica reduction method offer satisfactory serviceability for an amply long period even in highly corrosive liquids under harsh thermal conditions.

This invention, therefore, aims to provide a method for production of sliding members made preponderantly of a sintered ceramic material exhibiting excellence in mechanical strength, resistance to thermal shock, and resistance to corrosion at elevated temperatures.

BRIEF DESCRIPTION OF THE DRAWING

The drawing is a partially cutaway perspective view of a bearing embodying this invention.

DETAILED DESCRIPTION OF PREFERRED EMBODIMENTS

The present invention concerns a method for making sliding members of sintered ceramic pieces produced by molding in prescribed shapes the silicon nitride powder obtained by the silica reduction method and firing the molded masses of silicon nitride powder.

The silicon nitride powder to be used in this invention is manufactured by the silica reduction method to be described below.

Specifically, the silica reduction method comprises mixing silicon dioxide powder and carbon powder of an excess amount relative to the reaction equivalent weight thereof (preferably such that the $C/SiO_2$ ratio will fall in the range of 0.4 to 4) in conjunction with a small amount of a reaction catalyst selected from among silicon powder, silicon nitride powder, and silicon carbide powder and roasting the resultant mixture in an atmosphere of nitrogen at a temperature in the range of 1,350° to 1,600° C. (preferably 1,400° to 1,500° C.). In this method, silicon nitride powder containing carbon powder is obtained in consequence of the reaction shown by the following formula.

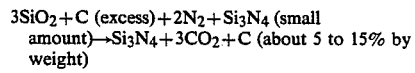

$3SiO_2 + C$ (excess) $+ 2N_2 + Si_3N_4$ (small amount) $\rightarrow Si_3N_4 + 3CO_2 + C$ (about 5 to 15% by weight)

Generally, as the starting components for the aforementioned reaction, 60 to 70% by weight of $SiO_2$ and 25 to 35% by weight of carbon powder are used as additionally mixed with 2 to 10% by weight of $Si_3N_4$ powder.

If the reaction temperature is lower than 1,350° C., the reaction velocity is low and the yield is insufficient. If it exceeds 1,600° C., the reaction entails formation of SiC. Thus, any deviation from the aforementioned temperature range is undesirable.

Adjustment of the amount of carbon powder remaining during the course of roasting can be easily effected by adjusting the roasting time. And the roasting is carried out by heating at a temperature in the range of 600° to 800° C. in an oxidative atmosphere.

The silicon nitride powder produced by the silica reduction method and used in the present invention advantageously has a carbon content in the range of 0.1 to 3% by weight.

The silicon nitride powder obtained as described above is such that α-phase silicon nitride accounts for at least 95%, whereas the silicon nitride powder obtained by the method such as metal silicon nitriding, etc. consists of about 90% of α-phase silicon nitride and the balance of β-phase silicon nitride. The silicon nitride powder is also characterized by having an average particle diameter less than 1 μm, whereas the silicon nitride powder obtained by the conventional method has an average particle diameter more than 1 μm.

This silicon nitride powder is comminuted, caused to contain therein not more than 10% by weight of such a sintering aid as yttrium oxide ($Y_2O_3$), aluminum oxide ($Al_2O_3$), or aluminum nitride (AlN), for example, 0.5 to 10% by weight of yttrium oxide ($Y_2O_3$), 0.1 to 10% by weight of aluminum oxide ($Al_2O_3$) or 0.1 to 10% by weight of aluminum nitride (AlN), and further mixed with an organic binder. The resultant mixture is molded in a prescribed shape, calcined at a temperature in the range of 1400° to 1600° C. and sintered at a temperature in the range of 1,600° to 1,800° C. The molding may be made in a complete shape which a final product is expected to assume.

Otherwise, it may be molded in the shape of a simple raw material such as a plate or round bar suitable for yielding a final product by machining. Then, the molded mass is fired and then cut in the final shape by machining.

The firing may be carried out in an inert atmosphere under atmospheric pressure. The method which fires the molded mass in a nitrogen-containing atmosphere under pressure of 1.5 to 50 kg/cm$^2$ or the method which sinters the molded mass with a hot press, however, proves advantageous.

Optionally, the characteristic properties of the sintered mass obtained by the method described above can be further improved by placing the sintered mass in an alumina container and heating it at a temperature of about 1,700° C. in an inert gas such as argon or nitrogen compressed to the level of about 1,000 kg/cm$^2$ thereby decreasing the spaces between the silica nitride particles.

The sliding member formed in a prescribed shape by machining is enabled to acquire improvement in mechanical strength, resistance to thermal shock, resistance to corrosion, etc. by being subjected to a heat treatment at a temperature of 800° to 1,200° C. (preferably 900° to 1,100° C.) in an oxidative atmosphere for one to 100 hours (preferably 2 to 50 hours).

The sliding member of this invention is particularly suitable for use in a bearing. When it is used in a bearing, this bearing may be wholly formed of sintered ceramic material. Optionally, only the balls or the rollers serving as rotating members in the bearing may be formed of sintered ceramic material. When the rotating members of the bearing are formed of sintered ceramic material as described above, they are less susceptible to the effect of centrifugal force because the sintered ceramic material is light. Thus, the properties of the rotating members during a high-speed rotation are improved.

EXAMPLE 1

A mixture was obtained by using 63% by weight of silicon dioxide powder having an average particle diameter of about 0.05 μm, 31% by weight of carbon powder having an average particle diameter of 0.03 μm, and 6% by weight of silicon nitride (α-phase $Si_3N_4$) having an average particle diameter of about 0.8 μm was heated under a flow of nitrogen gas at about 1,500° C. for about three hours, to effect reduction of the silicon dioxide powder.

The product of this reduction was silicon nitride powder (α-phase content more than 95%) having an average particle diameter of about 0.8 μm and containing carbon powder. The carbon powder content in the mixture was about 10% by weight. This mixture was heated in an oxygen-containing atmosphere at about 700° C. for one hour to adjust the carbon content to 1.75% by weight.

Then, the powder was combined with yttrium oxide, aluminum oxide, and aluminum nitride in such proper proportions that the resultant mixture consisted of 91% by weight of silicon nitride, 5% by weight of yttrium oxide, 2% by weight of aluminum oxide, and 2% by weight of aluminum nitride. The mixture was thoroughly blended, then caused to contain therein paraffin as a caking agent, and molded in a metal die under pressure of about 400 kg/cm$^2$ to produce a plate 40×40×8 mm. This plate was calcined in nitrogen gas at about 1,550° C. for about one hour and thereafter sintered in nitrogen gas at about 1,750° C. for about 2 hours.

The sintered silicon nitride plate was cut into square bars 3×3×35 mm and tested for breaking strength under the conditions of 0.5 mm/min. of crosshead speed, 20 mm of span, and a varying temperature of normal room temperature, 1,000° C., or 1,200° C. The results (breaking strength in kg/mm$^2$) are shown in the Table.

COMPARATIVE EXPERIMENT

Proceess was same as Example 1, except for the silicon powder adjusted by the metal silicon nitriding method which was not contained carbon. Obtained sintered silicon nitride article was tested as same as Example 1. Results are shown in the Table.

EXAMPLE 2

The carbon powder containing silicon nitride powder obtained in Example 1 was thoroughly mixed with yttrium oxide, aluminum oxide, and aluminum nitride in proportions such that the resultant mixture consisted of 91% by weight of silicon nitride, 5% by weight of yttrium oxide, 2% by weight of aluminum oxide, and 2% by weight of aluminum nitride. The resultant mixture and parrafin added thereto as a caking agent were molded in a metal die under pressure of about 300 kg/cm$^2$ to produce a plate 40×40×8 mm. This plate was pressed under hydro-static pressure of about 1 ton/cm$^2$ and then fired in nitrogen gas under the pressure of about 3 kg/cm$^2$ at about 1,6000 C. for about 2 hours.

Breaking strength of this working example was measured as same as Example 1. Results are shown in the Table.

EXAMPLE 3

The carbon powder containing silica nitride powder obtained in Example 1 was thoroughly mixed with yttrium oxide and aluminum oxide in proportions such that the resultant mixture consisted of 93% by weight of silicon nitride, 5% by weight of yttrium oxide, and 2% by weight of aluminum oxide. The resultant mixture and paraffin added thereto as a caking agent were molded in a metal die under pressure of about 300 kg/cm$^2$ to produce a plate 40×40×8 mm. This plate was pre-sintered in nitrogen gas at about 1,750 C. for about one hour and a half and then subjected to hot-press sintering in a carbon container using aluminum nitride as a packing powder at about 1,750 C. under pressure of about 500 kg/cm$^2$ for about 2 hours. Breaking strength of this working example was measured as same as Example 1. Results are shown in the Table.

PRACTICAL EXAMINATION

A bearing for each practical examination was produced by assembling rotating members obtained in Example 1, 2, 3 and comparative experiment by cutting the sintered silicon nitride material by machining and an inner race, an outer race and a retainer prepared separately for each rotating member in the same composition by the same method.

In the diagram, 1 stands for the inner race, 2 for the outer race, 3 for the rotating members and 4 for the retainer. Each bearing in the practical examination (except for the bearing in the comparative experiment) possessed outstanding mechanical strength even in fused plating metal and exhibited excellent resistance to thermal shock and to corrosion.

EXAMPLE 4

The bearing produced by assembling a rotating member, an inner race, an outer race and a retainer obtained by cutting the sintered silicon nitride in Example 1 was subjected to a heat treatment in an oxidative atmosphere at about 1,000° C. for 50 hours.

In consequence of this heat treatment, the characteristic properties of this bearing were improved and the dispersion in the properties was reduced.

TABLE

| | Examples | | | Comparative Experiment |
|---|---|---|---|---|
| | 1 | 2 | 3 | |
| Density (gr/cm$^2$) | 3.23 | 3.23 | 3.24 | 3.22 |
| Breaking Strength (kg/mm$^2$) | | | | |
| Normal Temperature | 100 | 110 | 120 | 90 |
| 1000° C. | 95 | 100 | 120 | 80 |
| 1200° C. | 80 | 80 | 85 | 50 |
| Practical Examination | good | good | good | poor |

What is claimed is:

1. A method for the production of a rotating member used in a bearing, which comprises mixing silicon dioxide and carbon powder in an excess amount relative to the reaction equivalent weight thereof in conjunction with a small amount of a reaction catalyst selected from among silicon powder, silicon nitride, and silicon carbide powder; thermally reducing the resultant mixture in an atmosphere of nitrogen at a temperature in the range of 1,350° C. to 1,600° C.; mixing the resultant silicon nitride powder and 0.5 to 10% by weight of yttrium oxide and 0.1 to 10% by weight of aluminum oxide to thereby provide a silicon nitride mixture, further mixing said silicon nitride mixture and a binder and molding the resultant blend under pressure; calcining the resultant shaped article in an inert atmosphere under applied pressure at a temperature in the range of 1,400° C. to 1,600° C.; sintering the calcined shaped article at a temperature in the range of 1,600° C. to 1,800° C.; machining the resultant sintered article to the desired shape, and subjecting the machined article to a heat treatment at 800° C. to 1,200° C. for one to 100 hours in an oxidizing atmosphere.

2. The method of claim 1, wherein said rotating member is a ball and/or roller bearing member.

3. A method for the production of a rotating member used in a bearing, which comprises mixing silicon dioxide and carbon powder in an excess amount relative to the reaction equivalent weight thereof in conjunction with a small amount of a reaction catalyst selected from among silicon powder, silicon nitride, and silicon carbide powder; thermally reducing the resultant mixture in an atmosphere of nitrogen at a temperature in the range of 1,350° C. to 1,600° C.; mixing the resultant silicon nitride powder and 0.5 to 10% by weight of yttrium oxide and 0.1 to 10% by weight of aluminum oxide to provide a silicon nitride mixture; further mixing said silicon nitride mixture and a binder and molding the resultant blend under applied pressure; further hydrostatically pressing the resultant shaped article under pressure of approximately 1 ton/cm$^2$; sintering the pressed article in an inert atmosphere under pressure in the range of 1.5 to 50 kg/cm$^2$ at a temperature in the range of 1,600° C. to 1,800° C. for a period of at least about one hour; machining the resultant sintered article to the desired shape and subjecting the machined article to a heat treatment at 800° C. to 1,200° C. for one to 100 hours in an oxidizing atmosphere.

4. The method of claim 3, wherein said rotating member is a ball and/or roller bearing member.

5. A method for the production of a rotating member used in a bearing, which comprises mixing silicon dioxide and carbon powder in an excess amount relative to the reaction equivalent weight thereof in conjunction with a small amount of a reaction catalyst selected from among silicon powder, silicon nitride, and silicon carbide powder; thermally reducing the resultant mixture in an atmosphere of nitrogen at a temperature in the range of 1,350° C. to 1,600° C.; mixing the resultant silicon nitride powder and 0.5 to 10% by weight of yttrium oxide and 0.1 to 10% by weight of aluminum oxide to provide a silicon nitride mixture; further mixing said silicon nitride mixture and a binder and molding the resultant blend under pressure of at least about 300 kg/cm$^2$; presintering the resultant shaped article in an inert atmosphere at a temperature in the range of 1,600° C. to 1,800° C. for a suitable period of time; further hot-press sintering the resultant pre-sintered article at a temperature in the range of 1,600° C. to 1,800° C. under pressure for a suitable period of time; machining the resultant sintered article to the desired shape and subjecting the machined article to a heat treatment at 800° C. to 1,200° C. for one to 100 hours in an oxidizing atmosphere.

6. The method of claim 5, wherein said rotating member is a ball and/or roller bearing member.

* * * * *